UNITED STATES PATENT OFFICE.

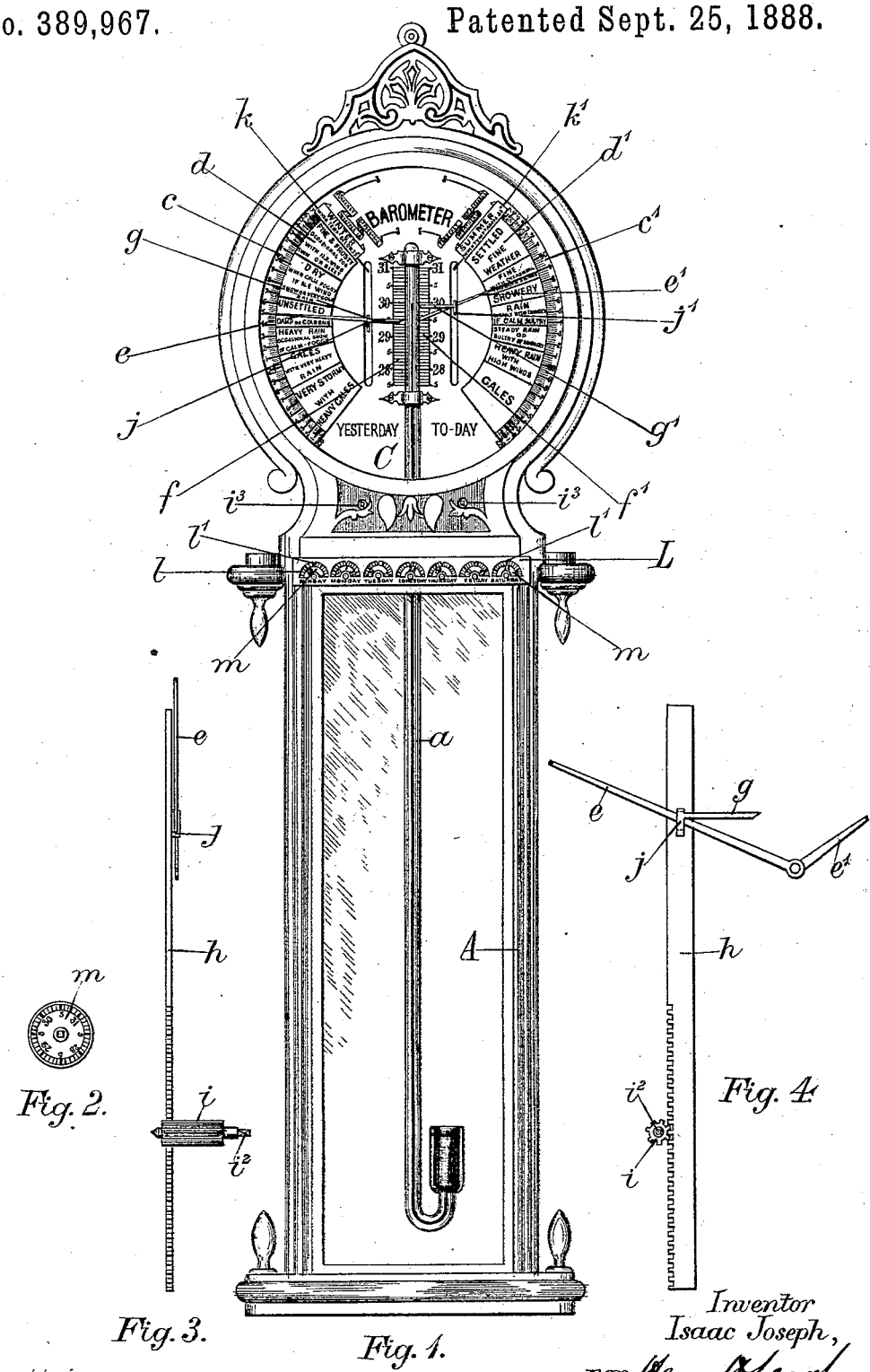

ISAAC JOSEPH, OF NO. 6 KENNINGTON PARK ROAD, COUNTY OF SURREY, ENGLAND.

INDICATING MECHANISM FOR BAROMETERS OR OTHER INSTRUMENTS.

SPECIFICATION forming part of Letters Patent No. 389,967, dated September 25, 1888.

Application filed October 24, 1887. Serial No. 253,383. (No model.) Patented in England January 27, 1887, No. 1,324.

*To all whom it may concern:*

Be it known that I, ISAAC JOSEPH, manufacturing optician, a subject of the Queen of Great Britain, and residing at No. 6 Kennington Park Road, in the county of Surrey, England, have invented certain new and useful Improvements in Registering and Recording Mechanisms for Barometers or Similar Meteorological or other Instruments, (for which I have obtained a patent in Great Britain, No. 1,324, bearing date January 27, 1887,) of which the following is a specification.

My invention relates to the construction of an improved indicating mechanism for barometers or similar meteorological or other instruments.

It has hitherto been the practice to supplement the coarse scale of a pediment barometer, for instance, with a sliding finely-divided vernier, by means of which the divisions of the coarse scale may be subdivided, as required, and the exact indication of the instrument ascertained; but the minute distances separating the marks on the vernier frequently interfere with their legibility to the extent of making a close scrutiny necessary to distinguish adjoining marks.

According to my present invention I provide a dial of as large a radius as is consistent with the general design of the instrument and mark upon it two arc-shaped scales of as large a radius as is practicable, and divide these scales with fine divisions representing as small subdivisions as fiftieths of an inch, which subdivisions are, as a consequence of the length of the arc-shaped scale as compared with that of the coarse scale, easily distinguishable. Upon each side of the tube I mark an ordinary coarse geometric scale. Either fine and coarse scale is, respectively, a counterpart of the other. The readings of a coarse scale are transferred to the fine scale by means of a pair of indices mechanically connected, so that they both move in harmony. I also provide a series of indicating-dials, by means of which the maximum, minimum, or average reading for any term may be indicated upon the dial appropriated thereto, thereby producing a regular indication of preceding readings, from which the general tendency of the phenomena under observation may be ascertained by a comparison of the several readings of all the terms indicated.

I attain the objects of my invention by means of the mechanism represented in the accompanying figures, which illustrate the application of my invention to a barometer, which I have chosen as a subject for illustration because of its being so familiar an instrument.

Figure 1 is an elevation of a barometer to which my invention has been applied. Fig. 2 is a detail, to a larger scale, of an indicating-dial. Fig. 3 is a side elevation, and Fig. 4 a front elevation, illustrating the mechanical connection between the indices of a coarse and a fine scale and the method of adjusting them.

A is the case, and $a$ the tube, both of them of any suitable construction or design.

C is the indicating-dial; $c\ c'$, the two arc-shaped scales, one a counterpart of the other, and both struck from the center of the dial with as long a radius as is practicable, with which are combined two weather-charts, one, $d$, for winter, and the other, $d'$ for summer. Each chart is divided and each division is provided with a description of the kind of weather which may be expected to accompany the barometric pressure corresponding with said division. The two indices $e\ e'$ for the respective scales $c\ c'$ are pivoted behind the tube $a$ to the center of the dial C on a common axis, about which they can be moved independently of each other. The two coarse scales $f\ f'$ are on opposite sides of the tube, and preferably meet behind it. These scales are geometric—that is, an inch is actually an inch, while the arc representing the inch twenty-nine inches to thirty inches, on either $c$ or $c'$, is necessarily longer than the arc representing the inch twenty-eight inches to twenty-nine inches. The reason of this difference will be explained farther on. As a result of the barometer-dial being marked with a short coarse vertical scale near the center of the dial, and an indication of the day to which it refers close to it, the reading of this scale can be taken by any one passing the instrument without it being necessary for him to observe it minutely, while at the same time, if he desires to have the reading to a fiftieth of an inch, he can obtain it from the fine scale by merely adjusting the index of the coarse scale.

The indices $g\ g'$ for the scales $f\ f'$ are respectively fast upon two racks, $h$, which can be moved up and down in guides, formed in the case of the instrument by means of pinions $i$, respectively engaging therewith. The arbors of these pinions revolve in suitable bearings, and the front end of each one terminates in a square, $i^2$, adapted to receive an adjusting-key through a hole, $i^3$, in the case of the instrument.

The racks have each one a loop, $j\ j'$, formed upon it, which loops project through slots $k\ k'$, cut in the dial C, and respectively embrace the indices $e\ e'$. The consequence of this mechanical connection between the index of a coarse scale and that of its corresponding finely-divided scale is that as the index, say $g$, of a coarse scale is adjusted according to the rise or fall of the mercury, the index $e$ of the corresponding finely-divided scale will be moved accordingly, and mark exactly upon its fine scale the height of the mercury in the tube; but as the index $e$ must travel through a longer arc to move from twenty-nine inches to thirty inches than from twenty-eight inches to twenty-nine inches on the scale $c$ the subdivisions of the former inch are proportionately larger than those of the latter.

L is a plate with a series of semicircular openings, $l$, cut in it. These are shown as arranged in a horizontal line, but they may be arranged as may be convenient. I have shown seven openings, because there are seven days in the week, but any other number may be used. Each opening has a small index, $l'$, depending from its top. Behind each opening is an indicating-dial, $m$, divided with a scale comprehensive enough to embrace the maximum variations of the mercury. These dials are independently movable upon their respective axes in the same way as before described with reference to a pinion, $i$.

Fig. 1 shows scales $c'$ and $f'$ with their indices as appropriated to to-day, scales $c$ and $f$ with their indices to yesterday, and the seven indicating-dials, respectively, to Sunday, Monday, Tuesday, Wednesday, Thursday, Friday, and Saturday—that is, to last week, yesterday being Sunday and to-day Monday. If required, the readings of the seven indicating-dials $l$ may be entered in a book ruled for that purpose. On Monday night—that is, at the close of to-day—the reading of scale $c$ will be transferred to the indicating-dial appropriated to Sunday, and that of scale $c'$ to scale $c$. The scales $c'$ and $f'$ can then be used for the next day, Tuesday.

I do not confine myself to making the longer and minutely-divided scale of an arc shape, although I wish to point out that this is the most convenient shape for an instrument with a dial-face. According to my invention the minutely-divided scale must be longer than the coarse scale; and it is evident that in some instruments this extra length can be secured without making the scale arc-shaped—e. g., it may be rectilinear and parallel with the coarse scale.

The connecting mechanism illustrated in the figures, and described therewith as making the two indices of a pair to move together, may be replaced by any other of equivalent effect.

In adapting my invention to instruments other than barometers the scales are modified accordingly, for the purpose of adapting them to the special function of the particular instrument. Thus if it be desired to adapt my invention to a thermometer the geometric scales close to the tube and marked $f$ and $f'$ in Fig. 1 will be replaced by scales set out in degrees—Fahrenheit, centigrade, or Reaumur, according to the scale or scales adopted. The arc-shaped scales $c\ c'$ will be divided to correspond, and their divisions subdivided. The weather-charts $d\ d'$ will be dispensed with or replaced by others adapted to the indicating powers of the instrument as a tester and indicator of varying temperatures.

Having fully described my invention, I declare that what I desire to claim as my invention, and to secure by Letters Patent, is—

1. The combination, on the face of a barometer or similar meteorological or other instrument, of a coarse scale close to the tube, a longer scale divided to correspond with the said coarse scale and minutely subdivided, two indices appropriated, respectively, to the said coarse and minutely-divided scales, one of which indices—viz., the one appropriated to the coarse scale—is fixed to a movable rack adapted to be operated from the outside of the case, and also by means of a connection between it and the index appropriated to the minutely-divided scale to move the said index over the said scale and to make both indices point to corresponding points on their respective scales at one time, and a series of indicating-dials adapted to indicate the reading registered by the before-mentioned indices.

2. The combination, on the dial of a barometer, of a coarse scale divided geometrically and parallel with the tube, a longer and arc-shaped scale divided to correspond with the said coarse scale and minutely subdivided, two indices appropriated, respectively, to the said coarse and minutely-divided scales, a mechanical connection between the said two indices adapted to be operated from the outside of the case of the barometer and to make both indices point at one time to corresponding points on their respective scales, and a series of independently-operated indicating-dials divided to correspond with either the said coarse geometric or the finely-divided arc-shaped scale and adapted to indicate their readings, substantially as hereinbefore described with reference to the accompanying drawings.

3. The combination of a pinion adapted to be moved at will on its axis, a rack with which said pinion engages, an index projecting from the end of said rack, a scale over which it can be moved by the rotation of said pinion, a pivoted index, and a loop upon said rack adapted to embrace the said pivoted index, substantially as described with reference to the accompanying drawings.

In witness whereof I have hereunto set my hand this 26th day of August, 1887.

ISAAC JOSEPH.

Witnesses:
 WALTER J. SKERTEN,
  17 *Gracechurch Street, London, E. C.*
 G. F. WARREN,
*Notary Public,* 17 *Gracechurch Street, London.*